US012028596B2

(12) United States Patent
Lu et al.

(10) Patent No.: US 12,028,596 B2
(45) Date of Patent: Jul. 2, 2024

(54) CAMERA MODULE AND ELECTRONIC DEVICE

(71) Applicant: VIVO MOBILE COMMUNICATION CO., LTD., Guangdong (CN)

(72) Inventors: Lianpeng Lu, Guangdong (CN); Dongcun Cheng, Guangdong (CN); Hao Jing, Guangdong (CN); Zhihao Niu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 213 days.

(21) Appl. No.: 17/707,280

(22) Filed: Mar. 29, 2022

(65) Prior Publication Data

US 2022/0224806 A1    Jul. 14, 2022

Related U.S. Application Data

(63) Continuation of application No. PCT/CN2020/117524, filed on Sep. 24, 2020.

(30) Foreign Application Priority Data

Sep. 30, 2019   (CN) .......................... 201910944159.1

(51) Int. Cl.
*H04N 23/54*   (2023.01)
*H04N 23/51*   (2023.01)
*H04N 23/68*   (2023.01)

(52) U.S. Cl.
CPC ............. *H04N 23/54* (2023.01); *H04N 23/51* (2023.01); *H04N 23/687* (2023.01)

(58) Field of Classification Search
CPC ...... H04N 23/51; H04N 23/54; H04N 23/687; H04N 23/57; H04N 23/685; H04N 23/50; H04N 23/55
See application file for complete search history.

(56) References Cited

U.S. PATENT DOCUMENTS 9,124,793 B2    9/2015   Sheu
2010/0134887 A1   6/2010   Shin
(Continued)

FOREIGN PATENT DOCUMENTS

CN    101685235 A    3/2010
CN    101959012 A    1/2011
(Continued)

OTHER PUBLICATIONS

First Office Action for Japanese Application No. 2022-518990, dated Mar. 29, 2023, 4 Pages.
(Continued)

*Primary Examiner* — Kelly L Jerabek
(74) *Attorney, Agent, or Firm* — Brooks Kushman P.C.

(57) ABSTRACT

A camera module, including a module housing, a first bracket, and a camera, where the module housing has an inner housing chamber, the first bracket is at least partly disposed in the inner housing chamber, the camera is at least partly disposed in the inner housing chamber, the camera is hinged to the first bracket by a first hinge shaft, the camera is able to rotate around the first hinge shaft, the first bracket is hinged to the module housing by a second hinge shaft, the first bracket rotates around the second hinge shaft, and an axis of the first hinge shaft and an axis of the second hinge shaft intersect or lie on different planes. The present invention discloses an electronic device.

20 Claims, 4 Drawing Sheets

(56) References Cited

U.S. PATENT DOCUMENTS

| | | |
|---|---|---|
| 2011/0013895 A1 | 1/2011 | Chiang |
| 2011/0141294 A1 | 6/2011 | Lam et al. |
| 2017/0331999 A1 | 11/2017 | Kang et al. |
| 2018/0321505 A1 | 11/2018 | Minamisawa |
| 2019/0018259 A1 | 1/2019 | Minamisawa et al. |
| 2019/0258144 A1 | 8/2019 | Strobert, Jr. et al. |
| 2020/0296191 A1 | 9/2020 | Zeng et al. |
| 2021/0203815 A1* | 7/2021 | Kim ............... H04N 23/54 |
| 2022/0182514 A1* | 6/2022 | Shen ............... H04N 23/685 |
| 2022/0224807 A1* | 7/2022 | Lu ............... H04N 23/55 |

FOREIGN PATENT DOCUMENTS

| | | |
|---|---|---|
| CN | 106657747 A | 5/2017 |
| CN | 108174079 A | 6/2018 |
| CN | 108696687 A | 10/2018 |
| CN | 110572556 A | 12/2019 |
| CN | 110661951 A | 1/2020 |
| CN | 110677567 A | 1/2020 |
| JP | 2008191615 A | 8/2008 |
| JP | 2011039113 A | 2/2011 |
| JP | 2018189816 A | 11/2018 |
| JP | 2021028656 A | 2/2021 |
| JP | 2021028657 A | 2/2021 |
| KR | 20100092821 A | 8/2010 |
| KR | 101640565 B1 | 7/2016 |
| KR | 20190007377 A | 1/2019 |
| WO | 2019128591 A1 | 7/2019 |

OTHER PUBLICATIONS

First Office Action for Indian Application No. 202227024308, dated Sep. 14, 2022, 6 Pages (including English Translation).
Extended European Search Report for Application No. 20872236.3—1208, dated Sep. 27, 2022, 8 Pages.
First Office Action for Chinese Application No. 201910944159.1, dated Sep. 1, 2020, 7 Pages.
International Search Report and Written Opinion for Application No. PCT/CN2020/117524, dated Dec. 25, 2020, 6 Pages.
Second Office Action for Japanese Application No. 2022-518990, dated Aug. 24, 2023, 5 Pages.
First Office Action for Korean Application No. 10-2022-7005752, dated Oct. 26, 2023, 4 Pages.

* cited by examiner

CAMERA MODULE AND ELECTRONIC DEVICE

CROSS-REFERENCE TO RELATED APPLICATIONS

This application is a continuation application of International Application No. PCT/CN2020/117524 filed on Sep. 24, 2020, which claims priority to Chinese Patent Application No. 201910944159.1, filed on Sep. 30, 2019, which are incorporated herein by reference in their entireties.

TECHNICAL FIELD

The present invention relates to the field of communications device technologies, and in particular, to a camera module and an electronic device.

BACKGROUND

With advancement of technologies, electronic devices (such as mobile phones and tablet computers) have been rapidly developed. As a powerful tool, an electronic device greatly facilitates life and work of user. Camera shooting is a basic function of the electronic device, which can meet user needs for shooting. Camera shooting is usually implemented by a camera module of the electronic device.

In a specific operation process, a user usually holds an electronic device to take pictures. Due to shake in handheld shooting, quality of the picture taken by the camera module is poor.

SUMMARY

The present invention discloses a camera module and an electronic device.

A camera module includes a module housing, a first bracket, and a camera, where the module housing has an inner housing chamber, the first bracket is at least partly disposed in the inner housing chamber, the camera is at least partly disposed in the inner housing chamber, the camera is hinged to the first bracket by a first hinge shaft, the camera is able to rotate around the first hinge shaft, the first bracket is hinged to the module housing by a second hinge shaft, the first bracket rotates around the second hinge shaft, and an axis of the first hinge shaft and an axis of the second hinge shaft intersect or lie on different planes.

An electronic device includes the foregoing camera module.

BRIEF DESCRIPTION OF DRAWINGS

The drawings described herein are used to provide a further understanding about the present invention, and constitute a part of the present invention. They are used to explain the present invention, but do not constitute any inappropriate limitation on the present invention. In the accompanying drawings.

Reference signs in the accompanying drawings are described as follows:

100. module housing; 110. inner housing chamber; 120. housing frame; 130. first cover plate; 131. second bypass hole; 140. second cover plate;

200. first bracket; 210. bracket body; 211. first bypass hole; 220. first connecting arm; 221. first hinge hole; 230. second connecting arm; 231. second hinge hole;

300. camera; 310. lens;

400. first hinge shaft;

500. second hinge shaft;

600. second bracket;

700. drive component; 710. permanent magnet; 720. electromagnet;

800. angle detection component; 810. Hall element; 820. third bracket;

900. flexible printed circuit board.

DETAILED DESCRIPTION

To make the objectives, technical solutions, and advantages of the present invention clearer, the following clearly and completely describes the technical solutions of the present invention with reference to specific embodiments of the present invention and corresponding drawings. Apparently, the described embodiments are merely some rather than all the embodiments of the present invention. Based on the embodiments of the present invention, all other embodiments obtained by a person of ordinary skill in the art without creative efforts shall fall within the protection scope of the present invention.

The technical solutions disclosed in the embodiments of the present invention are described in detail below with reference to the accompanying drawings.

Figure 1:
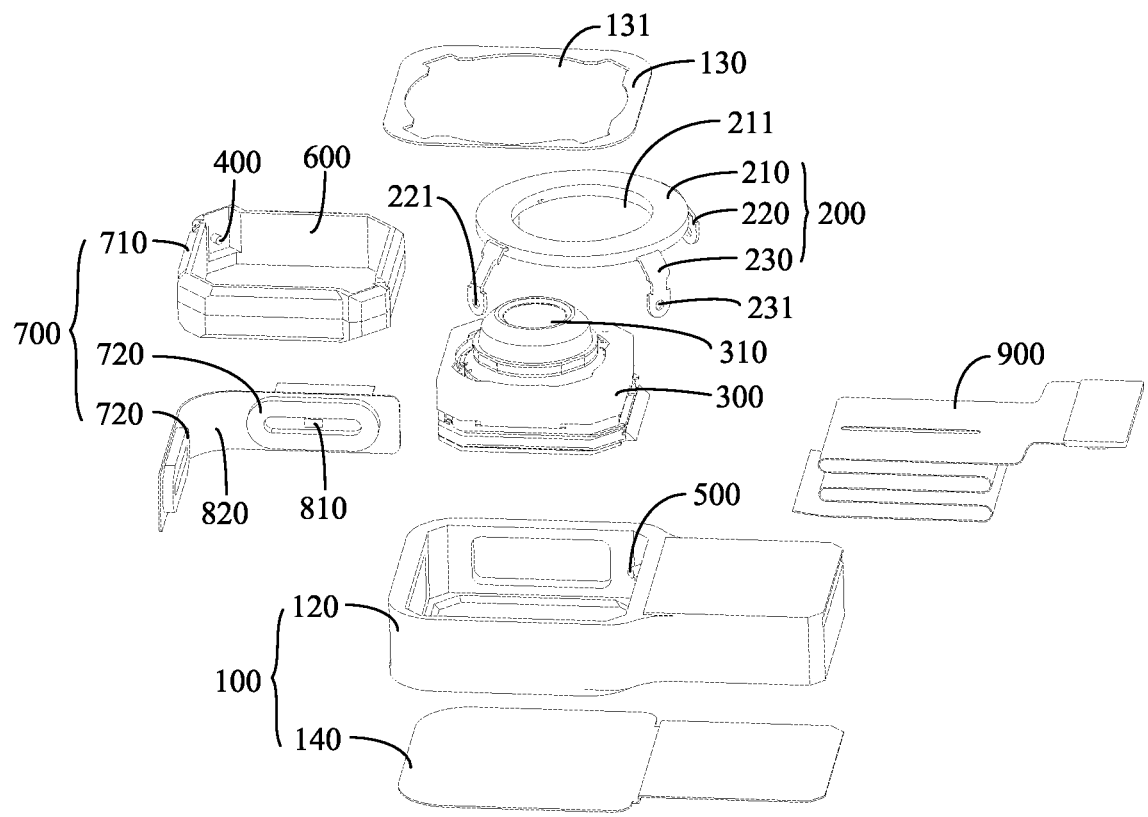
FIG. 1 is a schematic exploded view of a camera module according to an embodiment of the present invention.
Figure 2:
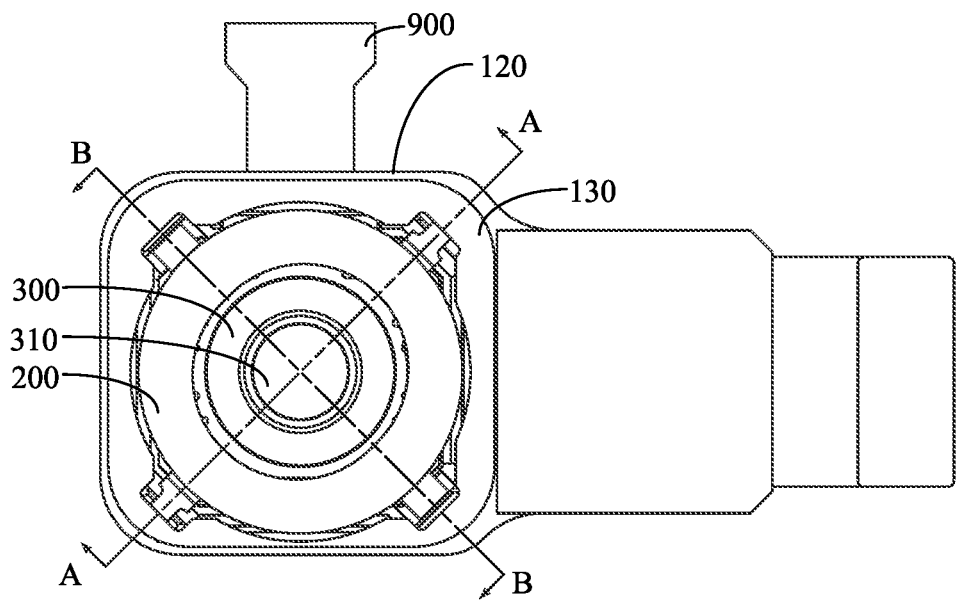
FIG. 2 is a schematic structural diagram of a camera module according to an embodiment of the present invention.
Figure 3:
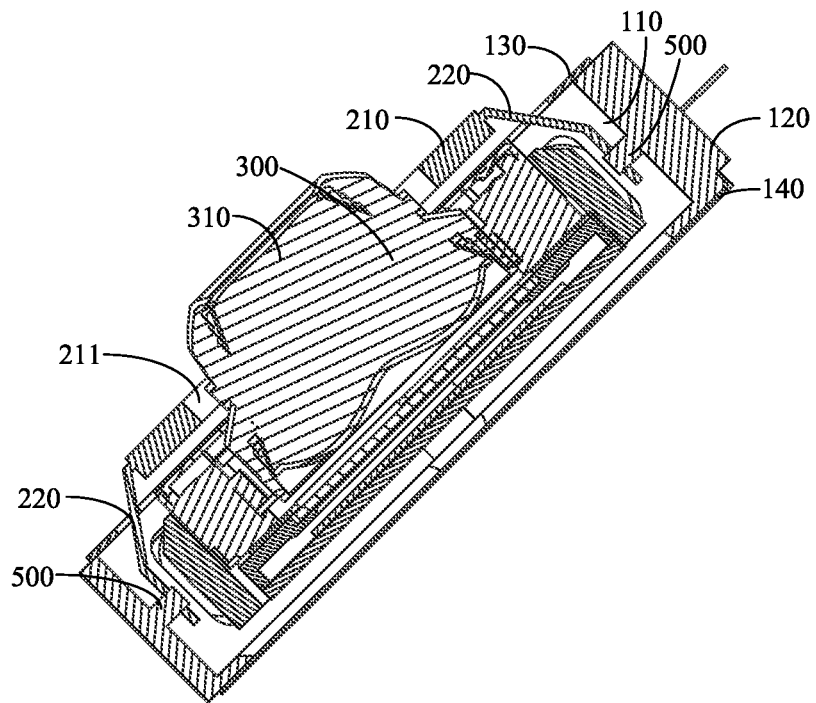
FIG. 3 is an A-A section view of FIG. 2.
Figure 4:
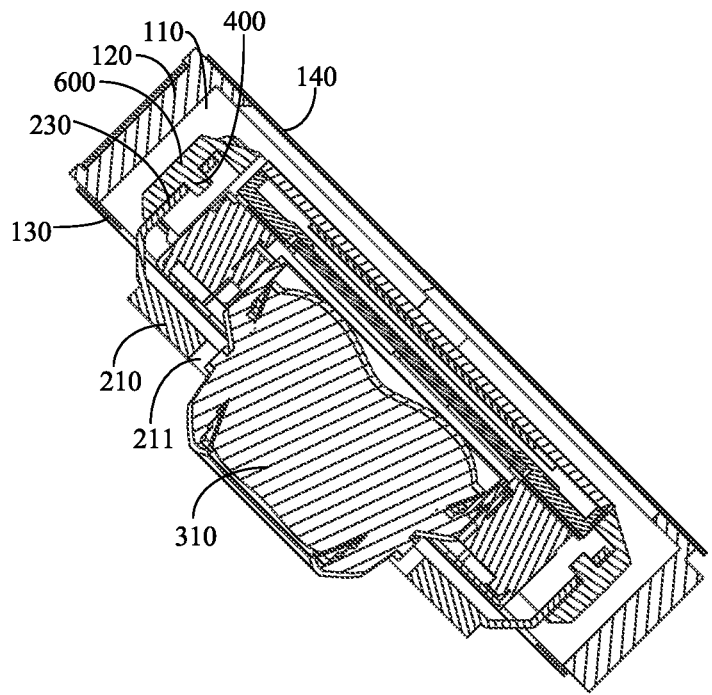
FIG. 4 is a B-B section view of FIG. 2.
Figure 5:
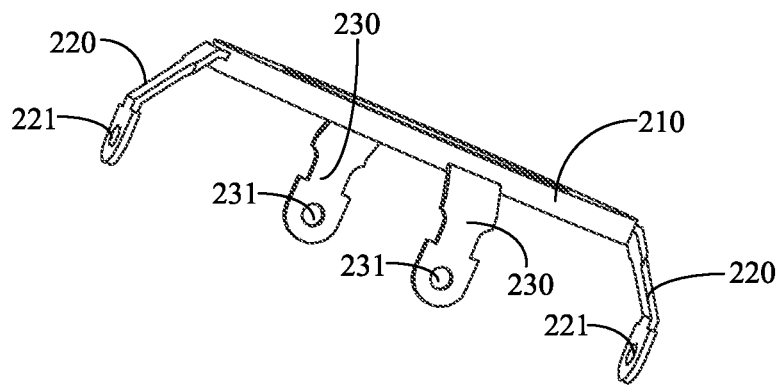
FIG. 5 is a schematic structural diagram of a first bracket according to an embodiment of the present invention.
Figure 6:
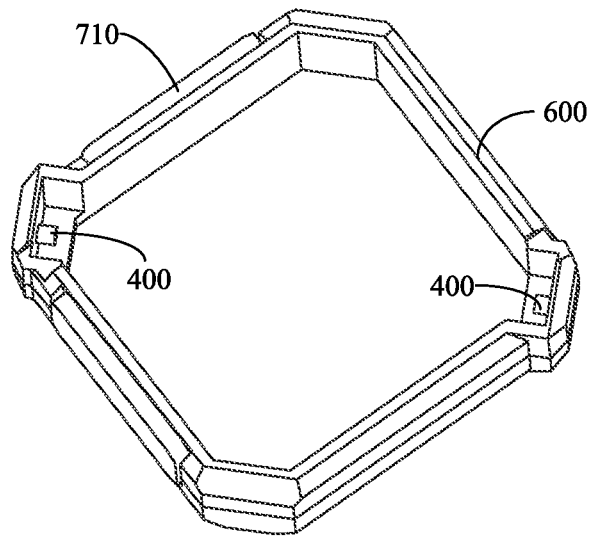
FIG. 6 is a schematic structural diagram of a second bracket according to an embodiment of the present invention.
Figure 7:
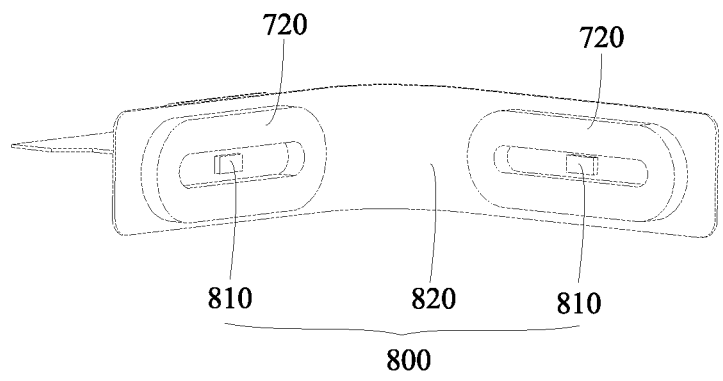
FIG. 7 is a partial schematic structural diagram of a camera module according to an embodiment of the present invention.
Figure 8:
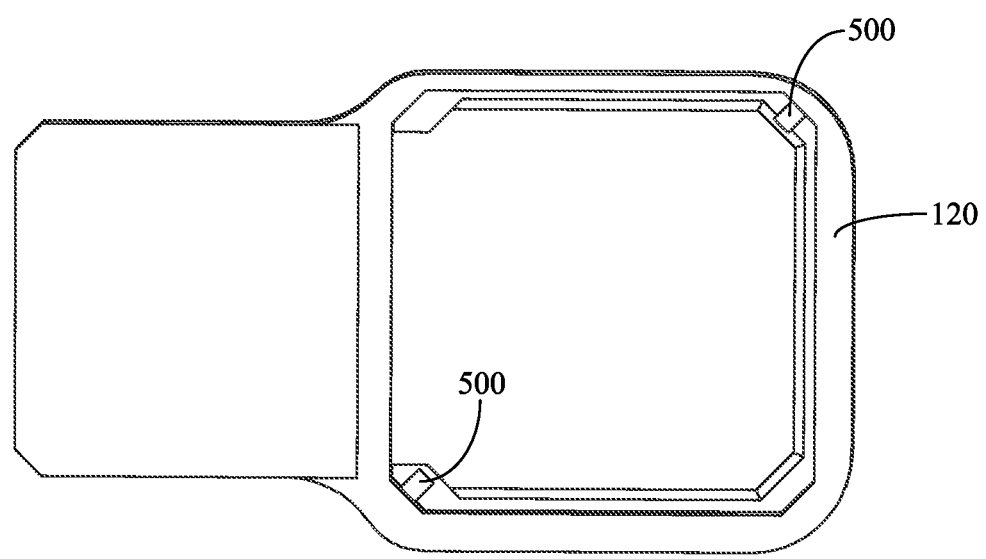
FIG. 8 is a partial schematic structural diagram of a camera module according to an embodiment of the present invention.

Referring to FIG. 1 to FIG. 8, the embodiments of the present invention disclose a camera module, where the disclosed camera module may be applied to an electronic device. The disclosed camera module may include a module housing 100, a first bracket 200, and a camera 300.

The module housing 100 is a basic member of the camera module, and the module housing 100 can provide a foundation for installing other components of the camera module. In the embodiments of the present invention, the module housing 100 has an inner housing chamber 110, where the inner housing chamber 110 has an opening that serves as a bypass.

The first bracket 200 is at least partly disposed in the inner housing chamber 110, the camera 300 is at least partly disposed in the inner housing chamber 110, and the camera 300 can take a picture through the opening of the inner housing chamber 110.

In the embodiments of the present invention, the camera 300 is hinged to the first bracket 200 by a first hinge shaft 400, and the camera 300 can rotate around the first hinge shaft 400. The first bracket 200 is hinged to the module housing 100 by a second hinge shaft 500, and the first bracket 200 rotates around the second hinge shaft 500. An axis of the first hinge shaft 400 and an axis of the second hinge shaft 500 intersect or lie on different planes. In other words, a direction in which the camera 300 rotates around the first hinge shaft 400 is inconsistent with a direction in which the first bracket 200 rotates around the second hinge shaft 500.

In a specific shooting process, the camera module may tilt due to shake, thereby affecting quality of the image. In the camera module disclosed in the embodiments of the present invention, the camera 300 can rotate around the first hinge shaft 400 with respect to the first bracket 200, and the first bracket 200 is hinged to the module housing 100 by the second hinge shaft 500, so that the camera 300 can rotate with the first bracket 200 around the second hinge shaft 500 with respect to the module housing 100. Because the axis of the first hinge shaft 400 and the axis of the second hinge shaft 500 intersect or lie on different planes, rotation of the camera 300 in two such directions can compensate for the angular component of the tilt in the two directions caused by shake of the camera module, so as to effectively prevent shake of the camera module, thereby resolving the problem of poor anti-shake performance of the camera module of the electronic device.

In an optional solution, the axis of the first hinge shaft 400 may be perpendicular to the axis of the second hinge shaft 500. In this case, the inclination angle caused by shaking of the entire camera module during shooting is easily resolved into two angular components around the axis of the first hinge shaft 400 and the axis of the second hinge shaft 500 respectively, so as to facilitate the angle compensation for the camera 300 during rotation.

The camera 300 is a relatively sophisticated device. In an optional solution, to avoid damage to the camera 300 due to assembly, the camera module disclosed in the embodiments of the present invention may further include a second bracket 600, and the camera 300 is rigidly connected to the second bracket 600. The second bracket 600 is hinged to the first bracket 200 by the first hinge shaft 400. As such, the camera 300 can rotate with the second bracket 600 around the first hinge shaft 400. In this case, the camera 300 does not need to be rotatably connected directly, and the camera 300 can be assembled to the second bracket 600 in an easy way that will not damage the camera 300.

The first bracket 200 may have various structures. Still referring to FIG. 1, in an optional solution, the first bracket 200 may include a bracket body 210 and a first connecting arm 220, where a first end of the first connecting arm 220 is rigidly connected to the bracket body 210. A second end of the first connecting arm 220 is a free end. The second hinge shaft 500 may be fastened to the module housing 100, the second end of the first connecting arm 220 may be provided with a first hinge hole 221, and the second hinge shaft 500 may be hinged to the first hinge hole 221. Hinging the first connecting arm 220 to the module housing 100 by the second hinge shaft 500 helps reduce space occupied by a hinge structure. Moreover, the second end of the first connecting arm 220 is a free end, that is, the first connecting arm 220 is a cantilever structure. The second end of the first connecting arm 220 can extend into the inner housing chamber 110 to implement a hinged connection, helping miniaturize the entire camera module.

In an optional solution, the first bracket 200 may further include a second connecting arm 230, where a first end of the second connecting arm 230 is rigidly connected to the bracket body 210, and a second end of the second connecting arm 230 is a free end. The first hinge shaft 400 is fastened to the second bracket 600 or the camera 300, the second end of the second connecting arm 230 is provided with a second hinge hole 231, and the second hinge hole 231 is hinged to the first hinge shaft 400. Similarly, the second end of the second connecting arm 230 can extend into the inner housing chamber 110 to implement a hinged connection, helping miniaturize the entire module bracket. In addition, the second connecting arm 230 is a cantilever structure, and the second hinge hole 231 is provided at the free end of the second connecting arm 230, so it is easy to implement hinge assembly through deformation of the second connecting arm 230.

In order to improve stability of the hinged connection, in an optional solution, two such first connecting arms 220 and two such second connecting arms 230 are provided, where the two first connecting arms 220 are diagonally arranged on two sides of the camera 300 respectively, and the two second connecting arms 230 are diagonally arranged on two sides of the camera 300 respectively. In this case, each first connecting arm 220 can be hinged to one second hinge shaft 500, and each second connecting arm 230 can be hinged to one first hinge shaft 400, which can undoubtedly improve the balance of rotation support.

In the embodiments of the present invention, the bracket body 210 is a main body portion of the first bracket 200, and the bracket body 210 can ensure that the first connecting arm 220 and the second connecting arm 230 have a higher strength. The bracket body 210 may have various structures. In an optional solution, the bracket body 210 may be provided with a first bypass hole 211. A lens 310 of the camera 300 may be arranged opposite the first bypass hole 211, and the lens 310 of the camera 300 can take a picture through the first bypass hole 211.

Specifically, the lens 310 of the camera 300 may be completely located in the inner housing chamber 110, may be located in the first bypass hole 211, or certainly, may extend out of the inner housing chamber 110 through the first bypass hole 211. In an optional solution, to prevent opening of the first bypass hole 211 from being excessively large, the lens 310 of the camera 300 is located in the first bypass hole 211 or extends out of the module housing 100 through the first bypass hole 211. This can prevent the opening of the first bypass hole 211 from being excessively large in a same field of view, or can ensure that the field of view of the lens 310 is larger with a given opening size of the first bypass hole 211. Certainly, the lens 310 of the camera 300 needs the first bypass hole 211 to form a gap around the lens 310. The gap allows the camera 300 to rotate in rotation process of the camera 300.

In an optional solution, to facilitate manufacturing and assembly, the first bracket 200 may be an integral structure. Specifically, the first bracket 200 may be an integral metal structure.

In a specific anti-shake operation process, the camera 300 needs to rotate around the first hinge shaft 400 and/or the second hinge shaft 500. The camera 300 can be driven to rotate in a plurality of manners. The camera module disclosed in the embodiments of the present invention may further include a first drive mechanism and a second drive mechanism. The first drive mechanism drives the camera 300 to rotate around the second hinge shaft 500, that is, drives the camera 300 to rotate with the first bracket 200 and the second bracket 600 around the second hinge shaft 500. The second drive mechanism drives the camera 300 to rotate around the first hinge shaft 400, that is, drives the camera 300, or the camera 300 and the second bracket 600 as a whole, to rotate around the first hinge shaft 400.

In a specific embodiment, the first drive mechanism and the second drive mechanism may both be drive motors, or include a drive motor and a transmission mechanism that fits with the drive motor, and the camera 300 is driven to rotate by the drive motor.

Certainly, the first drive mechanism and the second drive mechanism may alternatively be other types of drive mechanisms. Still referring to FIG. 1 and FIG. 7, in an optional solution, in the electronic device disclosed in the embodiments of the present invention, the first drive mechanism and the second drive mechanism each may be a drive component 700. The drive component 700 may include a permanent magnet 710 and an electromagnet 720.

The permanent magnet 710 may be disposed on the camera 300 or the second bracket 600, and the electromagnet 720 may be disposed on the module housing 100; or the electromagnet 720 may be disposed on the camera 300 or the second bracket 600, and the permanent magnet 710 may be disposed on the module housing 100.

When the first drive mechanism works, the permanent magnet 710 and the electromagnet 720 that are included in the first drive mechanism cooperate to produce a first magnetic force, and the first magnetic force drives the camera 300 to rotate around the first hinge shaft 400. When the second drive mechanism works, the permanent magnet 710 and the electromagnet 720 that are included in the second drive mechanism cooperate to produce a second magnetic force, and the second magnetic force drives the camera 300, the second bracket 600, and the first bracket 200 to rotate around the second hinge shaft 500.

In order to facilitate control of a rotation angle, the electronic device disclosed in the embodiments of the present invention may include an angle detection component 800, where the angle detection component 800 includes a Hall element 810. Specifically, the angle detection component 800 may include two Hall elements 810. The two Hall elements 810 cooperate with the first drive mechanism and the second drive mechanism respectively. As for the two Hall elements 810 and the corresponding permanent magnets 710, the permanent magnets 710 may be disposed on the camera 300 or the second bracket 600, and the Hall elements 810 may be disposed on the module housing 100; or the Hall elements 810 may be disposed on the camera 300 or the second bracket 600, and the permanent magnets 710 may be disposed on the module housing 100.

The rotation of the camera 300 around the second hinge shaft 500 and the rotation of the camera 300 around the first hinge shaft 400 can be detected by the corresponding angle detection component 800. The Hall element 810 cooperates with the corresponding permanent magnet 710 to detect a rotation angle of the camera 300 around the second hinge shaft 500 or the first hinge shaft 400, making it easier to control the angle compensation in a direction in which the camera 300 rotates around the second hinge shaft 500 or the first hinge shaft 400.

It should be noted that, in the embodiments of the present invention, technical means for detecting the rotation angle by cooperation between the Hall element 810 and the permanent magnet 710 is a widely-known technology. Details are not described herein.

In an optional solution, to facilitate assembly, the angle detection component 800 disclosed in the embodiments of the present invention may further include a third bracket 820. Both the electromagnet 720 and the Hall element 810 may be disposed on the third bracket 820. The third bracket 820 can be fastened to the module housing 100.

In the embodiments of the present invention, the module housing 100 may have various structures. Still referring to FIG. 1, in a specific implementation, the module housing 100 may include a housing frame 120, a first cover plate 130, and a second cover plate 140, where the first cover plate 130 is arranged on an opening at one end of the housing frame 120, the second cover plate 140 is arranged on an opening at the other end of the housing frame 120, the first cover plate 130, the second cover plate 140, and the housing frame 120 form the inner housing chamber 110, the first cover plate 130 is provided with a second bypass hole 131, and the second bypass hole 131 communicates with the inner housing chamber 110. The module housing 100 with the foregoing structure is assembly friendly, facilitating the installation of the camera 300. On the premise that the bracket body 210 is provided with the first bypass hole 211, the first bypass hole 211 is located in space surrounded by the hole wall of the second bypass hole 131.

Based on the camera module disclosed in the embodiments of the present invention, the embodiments of the present invention disclose an electronic device, and the disclosed electronic device includes the foregoing camera module. The camera 300 can be electrically connected to a mainboard of the electronic device through a flexible printed circuit board 900 that runs through the module housing 100, thereby implementing power supply to the camera 300. The flexible printed circuit board 900 has good deformability, and can better adapt to the rotation of the camera 300.

The electronic device in the embodiments of the present invention may be a smart phone, a tablet computer, an e-book reader, a wearable device, or the like. The embodiments of the present invention do not limit the specific type of the electronic device.

The foregoing embodiments of the present invention focus on the differences between the embodiments. Provided that different features of improvement in the embodiments are not contradictory, they can be combined to form a more preferred embodiment. Further descriptions are omitted herein for the purpose of brevity.

The foregoing descriptions are only embodiments of the present invention, but the present invention is not limited to such embodiments. For a person skilled in the art, the present invention may have various changes and variations. Any modification, equivalent replacement, or improvement made without departing from the spirit and principle of the present invention shall fall within the protection scope of the claims of the present invention.

What is claimed is:

1. A camera module, comprising a module housing, a first bracket, and a camera, wherein the module housing has an inner housing chamber, the first bracket is at least partly disposed in the inner housing chamber, the camera is at least partly disposed in the inner housing chamber, the camera is hinged to the first bracket by a first hinge shaft, the camera is able to rotate around the first hinge shaft, the first bracket is hinged to the module housing by a second hinge shaft, the first bracket rotates around the second hinge shaft, and an axis of the first hinge shaft and an axis of the second hinge shaft intersect or lie on different planes;

wherein the first bracket comprises a bracket body, a first connecting arm, and a second connecting arm, wherein one end of the first connecting arm is rigidly connected to the bracket body, the other end of the first connecting arm extends into the inner housing chamber and is hinged to the module housing by the second hinge shaft, one end of the second connecting arm is rigidly connected to the bracket body, and the other end of the second connecting arm extends into the inner housing chamber and is hinged to the camera by the first hinge shaft.

2. The camera module according to claim 1, wherein two such first connecting arms and two such second connecting arms are provided, wherein the two first connecting arms are diagonally arranged on two sides of the camera respectively, and the two second connecting arms are diagonally arranged on two sides of the camera respectively.

3. The camera module according to claim 1 wherein the bracket body is provided with a first bypass hole, and a lens of the camera is arranged opposite the first bypass hole.

4. The camera module according to claim 1, wherein the first bracket is an integral structure.

5. The camera module according to claim 1, wherein the camera module further comprises a second bracket, the camera is rigidly connected to the second bracket, and the second bracket is hinged to the first bracket by the first hinge shaft.

6. The camera module according to claim 1, wherein the camera module further comprises a first drive mechanism and a second drive mechanism, the first drive mechanism drives the camera to rotate around the second hinge shaft, and the second drive mechanism drives the camera to rotate around the first hinge shaft.

7. The camera module according to claim 1, wherein the axis of the first hinge shaft is perpendicular to the axis of the second hinge shaft.

8. The camera module according to claim 1, wherein the module housing comprises a housing frame, a first cover plate, and a second cover plate, wherein the first cover plate is arranged on an opening at one end of the housing frame, the second cover plate is arranged on an opening at the other end of the housing frame, the first cover plate, the second cover plate, and the housing frame form the inner housing chamber, the first cover plate is provided with a second bypass hole, and the second bypass hole communicates with the inner housing chamber.

9. The camera module according to claim 1, wherein the bracket body is a ring-shaped sheet structure.

10. The camera module according to claim 9, wherein the first connecting arm and the second connecting arm extend from a periphery of the bracket body and are spaced apart from each other; and the second connecting arm is deformable.

11. An electronic device, comprising a camera module, wherein the camera module comprises a module housing, a first bracket, and a camera, wherein the module housing has an inner housing chamber, the first bracket is at least partly disposed in the inner housing chamber, the camera is at least partly disposed in the inner housing chamber, the camera is hinged to the first bracket by a first hinge shaft, the camera is able to rotate around the first hinge shaft, the first bracket is hinged to the module housing by a second hinge shaft, the first bracket rotates around the second hinge shaft, and an axis of the first hinge shaft and an axis of the second hinge shaft intersect or lie on different planes;

wherein the first bracket comprises a bracket body, a first connecting arm, and a second connecting arm, wherein one end of the first connecting arm is rigidly connected to the bracket body, the other end of the first connecting arm extends into the inner housing chamber and is hinged to the module housing by the second hinge shaft, one end of the second connecting arm is rigidly connected to the bracket body, and the other end of the second connecting arm extends into the inner housing chamber and is hinged to the camera by the first hinge shaft.

12. The electronic device according to claim 11, wherein two such first connecting arms and two such second connecting arms are provided, wherein the two first connecting arms are diagonally arranged on two sides of the camera respectively, and the two second connecting arms are diagonally arranged on two sides of the camera respectively.

13. The electronic device according to claim 11, wherein the bracket body is provided with a first bypass hole, and a lens of the camera is arranged opposite the first bypass hole.

14. The electronic device according to claim 11, wherein the first bracket is an integral structure.

15. The electronic device according to claim 11, wherein the camera module further comprises a second bracket, the camera is rigidly connected to the second bracket, and the second bracket is hinged to the first bracket by the first hinge shaft.

16. The electronic device according to claim 11, wherein the camera module further comprises a first drive mechanism and a second drive mechanism, the first drive mechanism drives the camera to rotate around the second hinge shaft, and the second drive mechanism drives the camera to rotate around the first hinge shaft.

17. The electronic device according to claim 11, wherein the axis of the first hinge shaft is perpendicular to the axis of the second hinge shaft.

18. The electronic device according to claim 11, wherein the module housing comprises a housing frame, a first cover plate, and a second cover plate, wherein the first cover plate is arranged on an opening at one end of the housing frame, the second cover plate is arranged on an opening at the other end of the housing frame, the first cover plate, the second cover plate, and the housing frame form the inner housing chamber, the first cover plate is provided with a second bypass hole, and the second bypass hole communicates with the inner housing chamber.

19. The electronic device according to claim 11, wherein the bracket body is a ring-shaped sheet structure.

20. The electronic device according to claim 19, wherein the first connecting arm and the second connecting arm extend from a periphery of the bracket body and are spaced apart from each other; and the second connecting arm is deformable.

* * * * *